(12) United States Patent  
Mahmud et al.

(10) Patent No.: US 6,709,506 B2
(45) Date of Patent: *Mar. 23, 2004

(54) METHOD OF MAKING A MULTI-PHASE AGGREGATE USING A MULTI-STAGE PROCESS

(75) Inventors: Khaled Mahmud, Natick, MA (US); Meng-Jiao Wang, Lexington, MA (US); Yakov Kutsovsky, Arlington, MA (US)

(73) Assignee: Cabot Corporation, Boston, MA (US)

( * ) Notice: Subject to any disclaimer, the term of this patent is extended or adjusted under 35 U.S.C. 154(b) by 57 days.

This patent is subject to a terminal disclaimer.

(21) Appl. No.: 09/975,699

(22) Filed: Oct. 11, 2001

(65) Prior Publication Data

US 2002/0161099 A1 Oct. 31, 2002

Related U.S. Application Data

(63) Continuation of application No. 09/453,419, filed on Dec. 2, 1999, now Pat. No. 6,364,944, which is a continuation of application No. 09/375,044, filed on Aug. 16, 1999, now Pat. No. 6,211,279, which is a division of application No. 09/061,871, filed on Apr. 17, 1998, now Pat. No. 6,057,387, which is a continuation-in-part of application No. 08/837,493, filed on Apr. 18, 1997, now Pat. No. 5,904,762.

(51) Int. Cl.[7] .............................. C08K 9/02; C08K 3/18
(52) U.S. Cl. ....................... 106/475; 523/215; 523/216; 524/424; 524/495; 524/571
(58) Field of Search .................. 523/215; 524/424, 524/495, 571; 526/216; 106/475

(56) References Cited

U.S. PATENT DOCUMENTS

| 1,999,573 A | 4/1935 | Odell ........................ 134/60 |
| 2,121,535 A | 6/1938 | Amon ........................ 106/475 |
| 2,375,795 A | 5/1945 | Krejci ........................ 23/209.8 |
| 2,439,442 A | 4/1948 | Amon et al. ............... 23/209.1 |

(List continued on next page.)

FOREIGN PATENT DOCUMENTS

| EP | 0 278 743 A1 | 8/1988 | ............. C09C/1/56 |
| EP | 0 468 140 A2 | 1/1992 | |
| EP | 0 475 075 A1 | 3/1992 | |
| EP | 0 711 805 A1 | 5/1996 | |
| EP | 0 799 854 A1 | 10/1997 | |

(List continued on next page.)

OTHER PUBLICATIONS

EPO abstract of DE3502494 (Aug. 8, 1985) Yoko et al., "Modified carbon black".*
Derwent abstract ACC–No.: 1975–55789W, DE 240354A (Aug. 14, 1975), "Furnace black having reduced adsorption capacity . . . ".*
Patent Abstracts of Japan, publication No. 05–178604, "Carbon Black and Magnetic Recording Medium Using the Same," application No. 03–346246.*

(List continued on next page.)

Primary Examiner—Matthew A. Thexton

(57) ABSTRACT

An aggregate including a carbon phase and a silicon-containing species phase is described, wherein a difference between BET ($N_2$) surface area and t-area of the aggregate is from about 2 to 10 $m^2/g$; a difference between BET ($N_2$) surface area and t-area of from about 1 to 50 $m^2$/after HF treatment; a ratio of from about 0.1 to 10; a weight average aggregate size measured by DCP after HF treatment that is reduced by about 5% to 40%; a silica ash content in the aggregate of from about 0.05% to 1% based on the weight of the aggregate after HF treatment and based on ash resulting from silicon-containing compound; and a BET surface area of silica ash in the aggregate of from about 200 $m^2/g$ to 700 $m^2/g$, wherein the silicon-containing species phase is present primarily at the surface of the aggregate.

46 Claims, 1 Drawing Sheet

U.S. PATENT DOCUMENTS

| | | | | |
|---|---|---|---|---|
| 2,564,700 A | | 8/1951 | Krejci | 23/209.4 |
| 2,632,713 A | | 3/1953 | Krejci | 106/307 |
| 2,793,100 A | | 5/1957 | Weihe | 423/460 |
| 2,867,540 A | | 1/1959 | Harris | 106/476 |
| 3,011,902 A | | 12/1961 | Jordon | 106/30 R |
| 3,025,259 A | * | 3/1962 | Watson et al. | 523/215 |
| 3,094,428 A | | 6/1963 | Hamilton et al. | 106/307 |
| 3,188,225 A | | 6/1965 | Walker | 106/291 |
| 3,203,819 A | | 8/1965 | Steenken et al. | 106/307 |
| 3,290,165 A | | 12/1966 | Iannicelli | 106/308 |
| 3,317,458 A | | 5/1967 | Clas et al. | 260/41.5 |
| 3,335,020 A | | 8/1967 | Aboytes et al. | 106/476 |
| 3,390,006 A | | 6/1968 | Takewell et al. | 106/475 |
| 3,423,391 A | | 1/1969 | Kindler et al. | 106/20 R |
| T860,001 I4 | | 3/1969 | Gessler | |
| 3,528,840 A | | 9/1970 | Aboytes | 106/473 |
| 3,622,650 A | | 11/1971 | Berstein et al. | 260/763 |
| 3,660,132 A | * | 5/1972 | Illigen et al. | 106/426 |
| 3,663,285 A | | 5/1972 | Graf et al. | 106/308 |
| 3,671,476 A | | 6/1972 | Terai et al. | 260/23 |
| 3,676,070 A | | 7/1972 | Vanderveen et al. | 23/209.4 |
| 3,686,111 A | | 8/1972 | Makhloaf et al. | 524/530 |
| 3,689,452 A | | 9/1972 | Burke, Jr. | 260/33.6 |
| 3,716,513 A | | 2/1973 | Burke, Jr. | 260/33.6 |
| 3,864,455 A | | 2/1975 | Vanderveen | 423/450 |
| 3,963,510 A | * | 6/1976 | Osswald et al. | 106/402 |
| 3,997,356 A | | 12/1976 | Thurn et al. | 106/288 |
| 4,006,031 A | | 2/1977 | Ferch et al. | 106/473 |
| 4,014,844 A | | 3/1977 | Vidal et al. | 106/472 |
| 4,108,679 A | | 8/1978 | Szczepanik et al. | 106/307 |
| 4,211,578 A | | 7/1980 | Scott, IV | 106/475 |
| 4,221,693 A | | 9/1980 | Getson et al. | 260/37 |
| 4,265,768 A | | 5/1981 | Beasley et al. | 210/682 |
| 4,297,145 A | | 10/1981 | Wolff et al. | 106/308 |
| 4,320,011 A | | 3/1982 | Sato et al. | 210/694 |
| 4,366,139 A | | 12/1982 | Kuhner et al. | 423/449 |
| 4,452,638 A | | 6/1984 | Gallus | 106/97 |
| 4,530,961 A | | 7/1985 | Nguyen et al. | 106/20 R |
| 4,537,633 A | | 8/1985 | Hong | 106/96 |
| 4,590,052 A | | 5/1986 | Chevallier et al. | 423/335 |
| 4,597,794 A | | 7/1986 | Ohta et al. | 106/20 C |
| 4,670,059 A | | 6/1987 | Hackleman et al. | 106/475 |
| 4,751,204 A | | 6/1988 | Kyoden et al. | 501/89 |
| 4,820,751 A | * | 4/1989 | Takeshita et al. | 523/215 |
| 4,831,011 A | | 5/1989 | Oikawa et al. | 502/406 |
| 4,874,518 A | * | 10/1989 | Kirkland et al. | 210/502.1 |
| 4,929,391 A | | 5/1990 | Kroupa | 252/511 |
| 5,130,363 A | | 7/1992 | Scholl et al. | 524/392 |
| 5,149,732 A | | 9/1992 | Igarashi et al. | 524/426 |
| 5,159,009 A | | 10/1992 | Wolff et al. | 106/475 |
| 5,184,148 A | | 2/1993 | Suga et al. | 106/20 R |
| 5,190,582 A | | 3/1993 | Shinozuka et al. | 106/20 D |
| 5,205,866 A | | 4/1993 | Kiss et al. | 106/475 |
| 5,227,425 A | | 7/1993 | Rauline | 524/493 |
| 5,264,034 A | * | 11/1993 | Dietz et al. | 106/493 |
| 5,281,261 A | | 1/1994 | Lin | 106/20 R |
| 5,282,887 A | | 2/1994 | Gay et al. | 106/261 |
| 5,286,291 A | | 2/1994 | Bernhardt et al. | 106/475 |
| 5,294,253 A | | 3/1994 | Carlson et al. | 106/475 |
| 5,294,585 A | | 3/1994 | Moreau et al. | 502/413 |
| 5,328,949 A | | 7/1994 | Sandstrom et al. | 524/262 |
| 5,336,730 A | | 8/1994 | Sandstrom et al. | 524/492 |
| 5,401,313 A | | 3/1995 | Supplee et al. | 106/475 |
| 5,401,789 A | | 3/1995 | Wolff et al. | 523/213 |
| 5,411,577 A | | 5/1995 | Moreau et al. | 95/96 |
| 5,430,087 A | | 7/1995 | Carlson et al. | 106/475 |
| 5,502,146 A | | 3/1996 | Inoue et al. | 528/34 |
| 5,554,739 A | | 9/1996 | Belmont | 534/885 |
| 5,559,169 A | | 9/1996 | Belmont et al. | 523/215 |
| 5,571,311 A | | 11/1996 | Belmont et al. | 106/20 R |
| 5,575,845 A | | 11/1996 | Belmont et al. | 106/712 |
| 5,580,919 A | | 12/1996 | Agostini et al. | 524/430 |
| 5,622,557 A | | 4/1997 | Mahmud et al. | 106/712 |
| 5,630,868 A | | 5/1997 | Belmont et al. | 106/31.75 |
| 5,654,357 A | | 8/1997 | Menashi et al. | 524/495 |
| 5,672,198 A | | 9/1997 | Belmont | 106/20 |
| 5,679,728 A | | 10/1997 | Kawazura et al. | 523/216 |
| 5,698,016 A | | 12/1997 | Adams et al. | 106/31.6 |
| 5,707,432 A | | 1/1998 | Adams et al. | 106/31.6 |
| 5,713,988 A | | 2/1998 | Belmont et al. | 106/31.6 |
| 5,747,562 A | | 5/1998 | Mahmud et al. | 523/215 |
| 5,749,950 A | | 5/1998 | Mahmud et al. | 106/316 |
| 5,827,361 A | * | 10/1998 | Bernhardt et al. | 106/415 |
| 5,830,930 A | | 11/1998 | Mahmud et al. | 523/215 |
| 5,859,120 A | * | 1/1999 | Karl et al. | 524/495 |
| 5,863,323 A | | 1/1999 | Mahmud et al. | 106/712 |
| 5,869,550 A | | 2/1999 | Mahmud et al. | 523/215 |
| 5,877,238 A | | 3/1999 | Mahmud et al. | 523/215 |
| 5,904,762 A | | 5/1999 | Mahmud et al. | 106/475 |
| 5,916,934 A | | 6/1999 | Mahmud et al. | 523/215 |
| 5,919,841 A | | 7/1999 | Mahmud et al. | 523/351 |
| 5,919,855 A | | 7/1999 | Reed et al. | 524/496 |
| 5,948,835 A | | 9/1999 | Mahmud et al. | 523/215 |
| 5,977,213 A | | 11/1999 | Mahmud et al. | 523/351 |
| 6,017,980 A | | 1/2000 | Wang et al. | 523/215 |
| 6,020,402 A | | 2/2000 | Anand et al. | 523/212 |
| 6,028,137 A | | 2/2000 | Mahmud et al. | 524/496 |
| 6,057,387 A | | 5/2000 | Mahmud et al. | 523/215 |
| 6,068,688 A | | 5/2000 | Whitehouse et al. | 106/31.65 |
| 6,211,279 B1 | | 4/2001 | Mahmud et al. | 524/492 |
| 6,458,882 B1 | * | 10/2002 | Pyle et al. | 524/492 |

FOREIGN PATENT DOCUMENTS

| | | | | |
|---|---|---|---|---|
| EP | 0 799 867 A1 | 10/1997 | | |
| EP | 0 896 978 A2 | 2/1999 | | |
| GB | 0 862 018 | 3/1961 | | |
| GB | 1139620 | 1/1969 | | 106/475 |
| GB | 1191872 | 5/1970 | | |
| GB | 2 188 311 A | 9/1987 | | |
| GB | 2 296 915 A | 7/1996 | | |
| WO | WO 91/15425 | 1/1991 | | |
| WO | WO 92/13983 | 8/1992 | | |
| WO | WO 95/01838 | 1/1995 | | |
| WO | WO 96/18688 | 6/1996 | | |
| WO | WO 96/18689 | 6/1996 | | |
| WO | WO 96/18694 | 6/1996 | | |
| WO | WO 96/18695 | 6/1996 | | |
| WO | WO 96/18696 | 6/1996 | | |
| WO | WO 96/37546 | 11/1996 | | |
| WO | WO 96/37547 | 11/1996 | | |
| WO | WO 97/10291 | 3/1997 | | |
| WO | WO 97/47698 | 12/1997 | | C09C/11/00 |

OTHER PUBLICATIONS

CAS abstract (vol. 12, No. 128 (C–489)) JP 62–250073 A, "Carbon Black Having Modified Surface and Production Thereof.".*

Patent Abstracts of Japan, 56078629, Jun. 27, 1981, "Basic Malodorous Component Capturing Agent."*

Derwent Abstract, WPI AN 82–33295E/17, "Pigment for Colouring Concrete Items Exposed to Weathering is Used Together with Surfactant Which Irreversibly Loses its Activity when Concrete is Cured," basic abstract from DE 3039527.*

JPO abstract, JP40807365A, "Pneumatic Tire," Mar. 19, 1996.*

Patent Abstracts of Japan 06–067421, Mar. 11, 1994, "Black Photopolymerizable Composition, Black Hardened Film of the Composition, and Production of Color Filer."*

Derwent Abstract, WPI Acc No: 84–155581/25, "Surface Treatment of Carbon Fibre Acting as Cathode Comprises Treating with Electricity in Water in Presence of Basic Organic Amide," JP 59082467.*

Derwent Abstract, Acc–No: 1968–96844P, "Finely Divided Mineral Pigments Surface–treated with" abstracted pub no: FR 1499348A.*

Derwent Abstract, Acc–No: 1968–88852P, "Mineral Pigments Coated with Amino–organosilanes for," abstracted pub no: FR 1459019A.*

Derwent Abstract, AN No. 80–03330C, "Sulphonated Carbon Pigment Production by Treating Technical Grade Carbon with Hot Aqueous Acid," SU,A,659,523, Apr. 1979.

Derwent Abstract, AN No. 82–28019E, "Penetrating Flexographic Print Ink Based Polyacrylic Resin," Oct. 17, 1979, SU,A,834062.

Derwent Abstract, AN No. 86–335147, "Wear Resistant Rubber Composition for Tire Tread Rubber," Apr. 30, 1985, JPA 61–250042, Nov. 1986.

Derwent Abstract, AN No. 88–116672 "Surface Treatment of Carbon Black for Powder Coating . . . ," Mar. 22, 1988, JPA 86 0208468.

Derwent Abstract, AN No. 93–261471, "Carbon Black for Coating Magnetic Recording Media—Having Silicon Dioxide Coating, Giving Good Dispersibility, Lubrication, etc.", Japanese Patent Application No. 5178604, Jul. 20, 1993.

Derwent Abstract, AN No. 95–183086, "Tire Treated Rubber Composition," Oct. 21, 1993, JPA 07102116.

Derwent Abstract, AN No. 94–189154, "Ink for Writing Implements," May 10, 1994, JPA 61–28517A.

Patent Abstracts of Japan Publication No. JP7102116, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel,* vol. 43, No. 4, pp. 289–298, 1964, no month.

Roberts et al., *Basic Principles of Organic Chemistry,* Second Edition, W.A. Benjamin, Inc., Pub., p. 1080, no date available.

Zoheidi et al., "Role of Oxygen Surface Groups in Catalysis of Hydrogasification of Carbon Black by Potassium Carbonate," *Carbon,* vol. 25, No. 6, pp. 809 & 811, 1987, no month available.

Delamar et al., J. Am. Chem. Soc. 1992, 114, 5883–5884, no month available.

Concise Encyclopedia of Polymer Science and Engineering, Wiley, 1990, pp. 104–105.

Carbon (Carbon Black) reprinted from Kirk–Othmer: Encyclopedia of Chemical Technology, vol. 4, Third Edition, pp. 631–643, 1978.

Patent Abstracts of Japan, vol. 10, No. 112 (C–342), Apr. 25, 1986, JP 60 240768 A (Toukai Carbon) dated Nov. 29, 1985.

* cited by examiner

METHOD OF MAKING A MULTI-PHASE AGGREGATE USING A MULTI-STAGE PROCESS

This application is a continuation of U.S. patent application Ser. No. 09/453,419, filed Dec. 2, 1999, now U.S. Pat. No. 6,364,944, which is a continuation of U.S. patent application Ser. No. 09/375,044, filed Aug. 16, 1999, now U.S. Pat. No. 6,211,279, which is a divisional of U.S. patent application Ser. No. 09/061,871, filed Apr. 17, 1998, now U.S. Pat. No. 6,057,387, which is a continuation-in-part of U.S. patent application Ser. No. 08/837,493, filed Apr. 18, 1997, now U.S. Pat. No. 5,904,762, which is incorporated in its entirety by reference herein.

FIELD OF THE INVENTION

The present invention relates to a method of making an aggregate using a multi-stage process. In particular, the process relates to a method of making an aggregate comprising at least a carbon phase and a silicon-containing species phase using a multi-stage reactor. The present invention also relates to a method of making an aggregate comprising a carbon phase and a metal-containing species phase. The present invention in addition relates to the use of one or more of these aggregates in compositions such as elastomeric compositions and further relates to methods to improve rolling resistance and wet traction for tire compounds and relates to elastomeric compositions having these properties.

BACKGROUND OF THE INVENTION

Carbon blacks are widely used as pigments, fillers, and reinforcing agents in the compounding and preparation of rubber and other elastomeric compounds. Carbon blacks are particularly useful as reinforcing agents in the preparation of elastomeric compounds used in the manufacture of tires.

Carbon blacks are generally produced in a furnace-type reactor by pyrolyzing a hydrocarbon feedstock with hot combustion gases to produce combustion products containing particulate carbon black. Carbon black exists in the form of aggregates. The aggregates, in turn are formed of carbon black particles. However, carbon black particles do not generally exist independently of the carbon black aggregate. Carbon blacks are generally characterized on the basis of analytical properties, including, but not limited to, particle size and specific surface area; aggregate size, shape, and distribution; and chemical and physical properties of the surface. The properties of carbon blacks are analytically determined by tests known to the art. For example, nitrogen adsorption surface area (measured by ASTM test procedure D3037-Method A or D4820-Method B) and cetyl-trimethyl ammonium bromide adsorption value (CTAB) (measured by ASTM test procedure D3765 [09.01]), are measures of specific surface area. Dibutylphthalate absorption of the crushed (CDBP) (measured by ASTM test procedure D3493-86) and uncrushed (DBP) carbon black (measured by ASTM test procedure D2414-93), relates to the aggregate structure. The bound rubber value relates to the surface activity of the carbon black. The properties of a given carbon black depend upon the conditions of manufacture and may be modified, e.g., by altering temperature, pressure, feedstock, residence time, quench temperature, throughput, and other parameters.

It is generally desirable in the production of tires to employ carbon black-containing compounds when constructing the tread and other portions of the tire. For example, a suitable tread compound will employ an elastomer compounded to provide high abrasion resistance and good hysteresis balance at different temperatures. A tire having high abrasion resistance is desirable because abrasion resistance is proportional to tire life. The physical properties of the carbon black directly influence the abrasion resistance and hysteresis of the tread compound. Generally, a carbon black with a high surface area and small particle size will impart a high abrasion resistance and high hysteresis to the tread compound. Carbon black loading also affects the abrasion resistance of the elastomeric compounds. Abrasion resistance increases with increased loading, at least to an optimum point, beyond which abrasion resistance actually decreases.

The hysteresis of an elastomeric compound relates to the energy dissipated under cyclic deformation. In other words, the hysteresis of an elastomeric composition relates to the difference between the energy applied to deform the elastomeric composition and the energy released as the elastomeric composition recovers to its initial underformed state. Hysteresis is characterized by a loss tangent, tan $\delta$, which is a ratio of the loss modulus to the storage modulus (that is, viscous modulus to elastic modulus). Tires made with a tire tread compound having a lower hysteresis measured at higher temperatures, such as 40° C. or higher, will have reduced rolling resistance, which in turn, results in reduced fuel consumption by the vehicle using the tire. At the same time, a tire tread with a higher friction coefficient on a wet surface will result in a tire with high wet traction and wet skid resistance which will increase driving safety. Thus, a tire tread compound demonstrating low hysteresis at high temperatures and high hysteresis at low temperatures can be said to have a good hysteresis balance.

There are many other applications where it is useful to provide an elastomer exhibiting a good hysteresis balance but where the abrasion resistance is not an important factor. Such applications include but are not limited to tire components such as undertread, wedge compounds, sidewall, carcass, apex, bead filler and wire skim; engine mounts; and base compounds used in industrial drive and automotive belts.

Silica is also used as a reinforcing agent (or filler) for elastomers. However, using silica alone as a reinforcing agent for elastomer leads to poor performance compared to the results obtained with carbon black alone as the reinforcing agent. It is theorized that strong filler-filler interaction and poor filler-elastomer interaction accounts for the poor performance of silica. The silica-elastomer interaction can be improved by chemically bonding the two with a chemical coupling agent, such as bis (3-triethoxysilylpropyl) tetrasulfane, commercially available as Si-69 from Degussa AG, Germany. Coupling agents such as Si-69 create a chemical linkage between the elastomer and the silica, thereby coupling the silica to the elastomer.

When the silica is chemically coupled to the elastomer, certain performance characteristics of the resulting elastomeric composition are enhanced. When incorporated into vehicle tires, such elastomeric compounds provide improved hysteresis balance. However, elastomer compounds containing silica as the primary reinforcing agent exhibit low thermal conductivity, high electrical resistivity, high density, and poor processability.

When carbon black alone is used as a reinforcing agent in elastomeric compositions, it does not chemically couple to the elastomer but the carbon black surface provides many sites for interacting with the elastomer. While the use of a coupling agent with carbon black might provide some improvement in performance to an elastomeric composition, the improvement is not comparable to that obtained when using a coupling agent with silica.

SUMMARY OF THE INVENTION

The present invention relates to a method of making an aggregate comprising at least a carbon phase and a silicon-containing species phase. In the method, for a two stage feedstock injection system, a first feedstock is introduced into a first stage of a multi-stage reactor. The first feedstock comprises a carbon black-yielding feedstock, a silicon-containing compound or a mixture thereof. The method further includes the step of introducing a second feedstock into the reactor at a location downstream of the first stage. The second feedstock comprises a carbon black-yielding feedstock, a silicon-containing compound, or a mixture thereof, with the understanding that if the first feedstock comprises only a carbon black-yielding feedstock (without a silicon-containing compound), then the second feedstock comprises either a mixture of a carbon black-yielding feedstock and a silicon-containing compound or silicon-containing compound alone. At least one feedstock, either the first feedstock or the second feedstock, comprises at least a carbon black-yielding feedstock and at least one of the feedstocks, the first or the second feedstock, comprises a silicon-containing compound. However, the number of stages can be any number but must be at least two. The multi-stage reactor is maintained at a sufficient temperature to decompose the silicon-containing compound and to pyrolize the carbon black-yielding feedstock.

The present invention further relates to a method of making an aggregate comprising a carbon phase and a silicon-containing species phase, wherein a multi-stage reactor is used having at least three stages for introducing feedstocks into the reactor. The second and third stages as well as any additional stages are located downstream of the first stage. Each of the feedstocks introduced into the stages comprises a carbon black-yielding feedstock, a silicon-containing compound, or a mixture thereof. At least one of the stages comprises a carbon black-yielding feedstock and at least one of the stages comprises a silicon-containing compound. The reactor is maintained at a sufficient temperature to decompose the silicon-containing compound and to pyrolize the carbon black-yielding feedstock.

The aggregates of the present invention preferably have a rough surface measured by the difference between BET ($N_2$) surface area and t-area of the aggregate. Upon HF (hydrofluoric acid) treatment, BET area and t-area of this aggregate preferably increases. The aggregate size after HF treatment measured by DCP (Disc centrifuge photosedimentameter) may be generally reduced, and a certain amount of silica remains in the aggregate. The silica remaining after thermal treatment of the carbon phase at 500° C. in air preferably has a high surface area.

In addition, the present invention relates to a method of making an aggregate comprising a carbon phase and a metal-containing species phase wherein a multi-stage reactor is used having at least two stages for introducing feedstocks into the reactor. The second stage as well as any additional stages are located downstream of the first stage. Each of the feedstocks introduced into the stages comprises a carbon black-yielding feedstock, a metal-containing compound, or a mixture thereof. One or more of the feedstocks further optionally comprises a silicon-containing compound. At least one of the stages comprises a carbon black-yielding feedstock and at least one of the stages comprises a metal-containing compound. The reactor is maintained at a sufficient temperature to decompose the metal-containing compound and to pyrolize the carbon black-yielding feedstock.

The aggregates made from the above-described methods can be incorporated into elastomeric compositions. These elastomeric compositions can provide improved wet skid resistance and rolling resistance compared to elastomeric compositions not having any aggregates comprising a carbon phase and a silicon-containing species phase present.

It is to be understood that both the foregoing general description and the following detailed description are exemplary and explanatory only and are intended to provide further explanation of the present invention, as claimed. Additional features and advantages of the present invention will be set forth in part in the description which follows, and in part will be apparent from the description, or may be learned from the description, or may be learned by practice of the present invention. The objectives and other advantages of the present invention will be realized and attained by means of the elements and combinations particularly pointed out in the written description and appended claims.

The accompanying drawing, which is incorporated in and constitutes a part of this specification, illustrates an embodiment of the present invention and together with the description, serves to explain the principles of the present invention.

BRIEF DESCRIPTION OF THE DRAWING

The FIGURE is a schematic view of a portion of one type of a multistage reactor which may be used to produce the aggregates of the present invention.

DETAILED DESCRIPTION OF THE INVENTION

Figure 1:
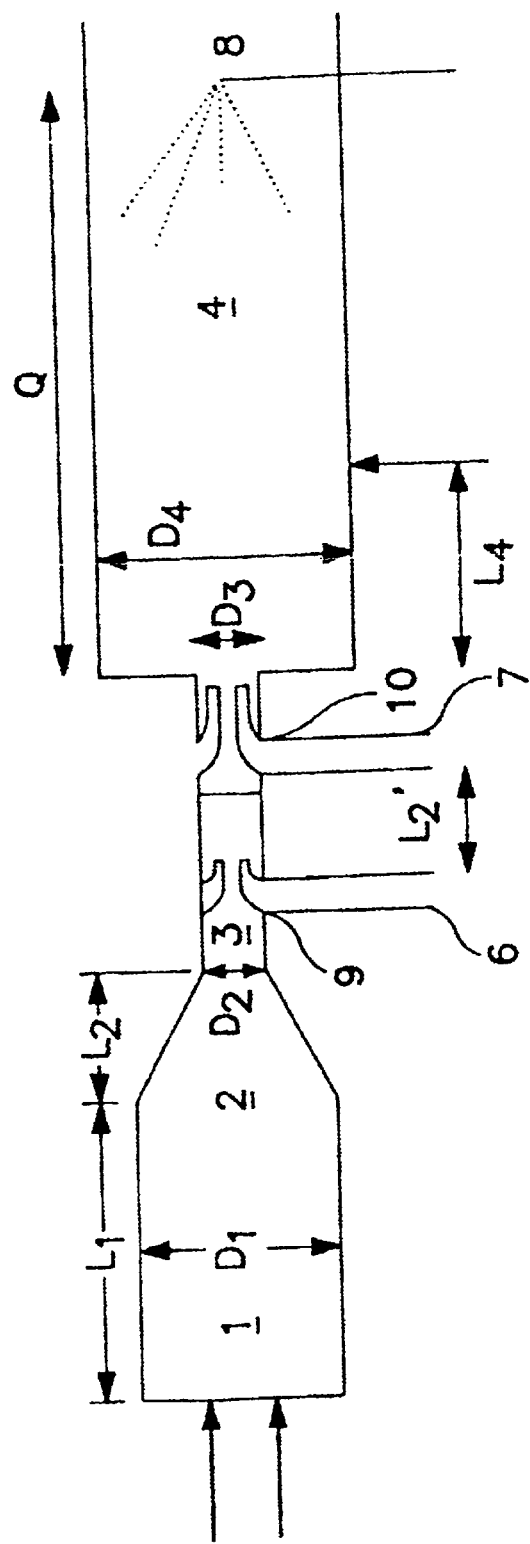

One embodiment of the present invention is directed to a method of making an aggregate comprising a carbon phase and a silicon-containing species phase. In addition to making an aggregate comprising a carbon phase and a silicon-containing species phase, the method of the present invention can optionally also produce carbon black and/or silica.

For purposes of the present invention, the aggregate comprising a carbon phase and a silicon-containing species phase and made from the processes of the present invention can also be identified as a silicon-treated carbon black. In the aggregate comprising a carbon phase and a silicon-containing species phase, a silicon-containing species, including but not limited to, oxides and carbides of silicon, may be distributed through at least a portion of the aggregate and is an intrinsic part of the aggregate which also contains the carbon phase. In other words, the silicon-treated carbon black or the aggregate does not represent a mixture of discrete carbon black aggregates and discrete silica aggregates. Rather, the silicon-treated carbon black of the present invention includes at least one silicon-containing region as part of the silicon-treated carbon black wherein the silicon-containing region is located at the surface of and/or within the silicon-treated carbon black. The silicon-containing species that is part of the aggregate of the present invention is not attached to a carbon black aggregate like a silane coupling agent, but actually is part, of the same aggregate as the carbon phase. The disclosures of U.S. patent application Ser. No. 08/446,141, filed May 22, 1995, now U.S. Pat. No. 5,830,930, U.S. patent application Ser. No. 08/446,142, filed May 22, 1995; now U.S. Pat. No. 5,877,238, and U.S. patent application Ser. No. 08/750,016, filed Feb. 25, 1997, now U.S. Pat. No. 5,916,934, which is a National Phase application of PCT Published Application No. WO 96/37547 are incorporated in their entirety herein by reference.

When the silicon-treated carbon black is examined under scanning transmission electron microscope-energy dispersive x-ray (STEM-EDX), the silicon signal corresponding to the silicon-containing species is found to be present in individual carbon black aggregates. By comparison, for example, in a physical mixture of silica and carbon black, STEM-EDX examination reveals distinctly separate silica and carbon black aggregates.

The aggregates preferably made with the processes of the present invention preferably lead to improved wet skid resistance and/or rolling resistance properties in an elastomeric composition when the aggregates of the present invention are incorporated into the elastomeric composition.

With regard to a process of the present invention, the aggregates or the silicon-treated carbon blacks of the present invention may be obtained by manufacturing or forming the carbon black (i.e., the carbon phase) in the presence of one or more volatilizable and/or decomposable silicon-containing compounds. A modular or "staged," furnace carbon black reactor as depicted in the FIGURE is preferably used. The furnace or reactor preferably has more than one stage or entry point for feedstocks. As depicted in the FIGURE, the reactor preferably has a combustion zone 1, with a zone of converging diameter 2; a feedstock injection zone with restricted diameter 3; and a reaction zone 4.

To produce the aggregates or the silicon-treated carbon blacks of the present invention with the reactor described above, hot combustion gases are generated in combustion zone 1 by contacting a liquid or gaseous fuel with a suitable oxidant stream such as air, oxygen, or mixtures of air and oxygen. Among the fuels suitable for use in contacting the oxidant stream in combustion zone 1, to generate the hot combustion gases, are included any readily combustible gas, vapor, or liquid streams such as natural gas, hydrogen, methane, acetylene, alcohols, or kerosene. It is generally preferred, however, to use fuels having a high content of carbon-containing components and in particular, hydrocarbons. The ratio of air-to-fuel varies with the type of fuel utilized. When natural gas is used to produce the carbon phase of the present invention, the ratio of air-to-fuel may be from about 10:1 to about 1000:1. To facilitate the generation of hot combustion gases; the oxidant stream may be preheated. U.S. Pat. Nos. 3,952,087 and 3,725,103 are incorporated in their entirety by reference and describe carbon black-yielding feedstocks, reactor set-up, and conditions.

The hot combustion gas stream flows downstream from zones 1 and 2 into zones 3 and 4. The direction of the flow of hot combustion gases is shown in the FIGURE by the arrow. A first feedstock is introduced at location 6 and enters the feedstock injection zone 3 at entry point 9. In this embodiment, the feedstocks are introduced or injected into a preformed stream of hot combustion gasses flowing in a downstream direction. While the FIGURE depicts entry points 9 and 10 for introduction of the feedstock, the feedstocks can be introduced at any point in the reactor as long as there is a sufficient temperature and residence time for the silicon-treated carbon black to form before the quench location. The feedstock is injected into the gas stream preferably through nozzles designed for optimal distribution of the oil in the gas stream. Such nozzles may be either single or bi-fluid. Bi-fluid nozzles may use steam or air to atomize the fuel. Single-fluid nozzles may be pressure atomized or the feedstock can be directly injected into the gas stream. In the latter instance, atomization occurs by the force of the gas stream.

In an embodiment of the present invention, the first feedstock comprises a carbon black-yielding feedstock, a silicon-containing compound, or a mixture thereof. Also, the first feedstock, as well as all of the feedstocks described hereinafter, may further comprise additional materials or compositions which are commonly used to make conventional carbon black. One or more feedstocks can also contain a boron-containing compound.

Located downstream of the point where the first feedstock is introduced into the feedstock injection zone 3 of the reactor, a second feedstock is introduced, for example, through location 7 into the feedstock injection zone 3. The second feedstock can enter the feedstock injection zone for instance, at entry point 10. The second and subsequent feedstocks are preferably added at the zone of substantial reaction, which is where the earlier feedstocks will primarily react to form the aggregates. The second feedstock comprises a carbon black-yielding feedstock, a silicon-containing compound, or a mixture thereof. As in the case of the first feedstock, other additional compounds or materials can also be included as part of the feedstock. Furthermore, the first feedstock and the second feedstock can be the same or different with respect to feedstocks.

When a two-stage reactor is used, for purposes of an embodiment of the present invention, if the first feedstock contains a carbon black-yielding feedstock (without a silicon-containing compound), then the second feedstock comprises either a mixture of a carbon black-yielding feedstock and a silicon-containing compound or a silicon-containing compound alone. In other words, one or both feedstocks may contain a carbon black-yielding feedstock, and at least one feedstock will additionally contain a silicon-containing compound.

In addition, additional feedstocks can be introduced into the feedstock injection zone by additional entry points which can be located downstream of the first and/or second entry points for the first and second feedstocks. If necessary, a reactor can be modified to lengthen the feedstock injection zone to accommodate the additional entry points.

For purposes of the present invention where a two-stage reactor is used to make an aggregate comprises a carbon phase and a silicon-containing phase, at least one of the feedstocks must include a carbon black-yielding feedstock and at least one of the feedstocks must contain a silicon-containing feedstock. Thus, and only as an example, the first feedstock can include a mixture of a carbon black-yielding feedstock and a silicon-containing compound while the second feedstock can also include either a mixture of a carbon black-yielding feedstock and a silicon-containing compound or a silicon-containing compound only. The first feedstock and the second feedstock can both include a carbon black-yielding feedstock and the second feedstock can also include a silicon-containing compound. Accordingly, almost any combination of feedstocks is possible in the two-stage process as long as a carbon black-yielding feedstock and a silicon-containing compound are present either in the same or different feedstocks. As stated earlier, in a two-stage process, when the first feedstock comprises a carbon black-yielding feedstock (without a silicon-containing compound), then the second feedstock comprises a mixture of a carbon black-yielding feedstock and a silicon-containing compound or silicon-containing compound alone.

It is preferred that the first feedstock comprises a carbon black-yielding feedstock and that at least about 5% by weight of the total amount of carbon black-yielding feedstock used in the process is present in the first feedstock. More preferably, from about 10% by weight to about 100% by weight, and even more preferably, from about 40% by weight to about 100% by weight of the total amount of carbon black-yielding feedstock used in said method is present in the first feedstock.

In another embodiment of the present invention, the aggregate or silicon-treated carbon black of the present invention can be made using a multi-stage reactor, wherein the reactor has at least three stages for introducing feedstocks into the reactor. The second and third stages, as well as any additional stages, are located downstream of the first stage. As stated earlier, these stages can be located anywhere downstream as long as there is a sufficient temperature and residence time for the silicon-treated carbon black to form before any quenching occurs. Each of the feedstocks introduced into the stages comprises a carbon black-yielding feedstock, a silicon-containing compound, or a mixture thereof. At least one of the stages comprises a carbon black-yielding feedstock and at least one of the stages, which can be the same stage containing the carbon black-yielding feedstock, comprises a silicon-containing compound. The reactor is maintained at a sufficient temperature to decompose the silicon-containing compound and to pyrolize the carbon black-yielding feedstock.

Referring to the FIGURE again, the mixture of feedstocks and hot combustion gases flows downstream through zones 3 and 4. In the reaction zone portion of the reactor, the portion of the feedstock which contains the carbon black-yielding feedstock is pyrolyzed to carbon black to form the carbon phase of the aggregate. The feedstock portion containing the silicon-containing compound undergoes volatilization and decomposes, and preferably reacts with other species in the reaction zone and forms a silicon-containing species phase. The presence of the carbon black-yielding feedstock and the silicon-containing compound in the reactor leads to the aggregate comprising a carbon phase and a silicon-containing species phase. The silicon-containing species are an intrinsic part of the aggregate and are part of the same aggregate as the carbon phase. An example of a silicon-containing species is silica. Besides volatilizable compounds, decomposable compounds which are not necessarily volatilizable can also be used to yield the silicon-containing species phase of the aggregates of the present invention. As stated earlier, besides the formation of an aggregate comprising a carbon phase and a silicon-treated species phase, carbon black and/or silica may additionally be formed.

The reaction in the reaction zone is then arrested in the quench zone of the reactor. Quench 8 is located downstream of the feedstock entry points and the reaction zone and sprays a quenching fluid, generally water, into the stream of newly formed aggregates or silicon-treated carbon black and any carbon black and/or silica that may also be present. The quench serves to cool the aggregates or particles and to reduce the temperature of the gaseous stream and decrease the reaction rate. Q is the distance from the beginning reaction zone 4 to quench 8 and will vary according to the position of the quench. Optionally, quenching may be staged, or take place at several points in the reactor.

After the aggregates or particles are quenched, the cooled gases and the aggregates pass downstream into any conventional cooling and separating means whereby the aggregates and any coproduced carbon black and/or silica are recovered. The separation of the aggregates from the gas stream is readily accomplished by conventional means such as a precipitator, cyclone separator, bag filter, or other means known to those skilled in the art. After the aggregates have been separated from the gas stream, they are optionally subjected to a pelletization step.

Useful volatilizable silicon-containing compounds include any such compound which is volatilizable at carbon black reactor temperatures. Examples include, but are not limited to, silicates such as tetraethoxyorthosilicate (TEOS) and tetramethoxyorthosilicate, silanes for example alkoxysilanes, algylalkoxysilanes and aryl-alkylalkoxysilanes, for example, tetramethoxysilane, tetraethoxysilane, methyltrimethoxy-silane, methyltriethoxy silane, dimethyldimethoxysilane, dimethyldiethoxysilane, trimethylmethoxysilane, trimethylethoxysilane, diethylpropylethoxysilane, halogen-organosilanes for examples, tetrachiorosilane, trichloromethylsilane, dimethyl-dichlorosilane, trimethylchlorosilane, methyethyldichlorosilane, dimethylethylchlorosilane, dimethyethylbromosilane, silicone oil, polysiloxanes and cyclic polysiloxanes for example, octamethylcyclotetrasiloxane (OMTS), decamethylcyclopentasiloxane, dodecamethylcyclohexasiloxane, hexamethyl-cyclotrisiloxane, and silazanes for example, hexamethyldisilazane. Besides volatilizable compounds. decomposable silicon-containing compounds which are not necessarily volatilizable can also be used to yield the silicon-treated carbon black. Silicon-containing compounds which may be used are set forth in *Encyclopedia of Science and Engineering,* Vol. 15, 2nd Ed pp. 204–308, and UK Patent Application 2 296 915, both incorporated herein by reference. The usefulness of these compounds can be readily determined for their volatilizability and/or decomposability. Low molecular weight silicon-containing compounds are preferred. The flow rate of the volatilizable compound will determine the weight percent of silicon in the silicon-treated carbon black.

Generally, if the silicon-containing compound is introduced substantially simultaneously with the carbon black-yielding feedstock, the silicon-containing species phase(s) are distributed throughout the aggregate. If the silicon-containing compound is introduced to the reaction zone at a point after the carbon black formation has commenced (i.e., during the formation of the carbon phase), but before the reaction stream has been subjected to the quench, the silicon-containing species phase is present primarily at or near the surface of the aggregate but is still part of the same aggregate as the carbon phase.

In general, the multi-phase aggregates of the present invention can be used either in nonagglomerated form, i.e., fluffy, or in agglomerated form. The multi-phase aggregate can be agglomerated in wet or dry processes as known in the art. During the wet agglomeration process, different types of pelletizing agents (e.g., binders and the like) can be added to the pelletizing water, see e.g. WO 96/29710, incorporated herein by reference. Also, a coupling agent may be attached to the aggregate before or after pelletization, as described in U.S. patent application Ser. No. 08/850,145, now U.S. Pat. No. 5,977,213, incorporated in its entirety herein by reference.

The aggregate of the present invention can be characterized by one or more of the following various properties. For instance, the aggregate can have a rough surface characterized by the difference between BET ($N_2$) surface area and t-area which preferably ranges from about 2 to about 100 $m^2/g$. For an aggregate with t-area above 100 $m^2/g$, the difference between BET ($N_2$) surface area and t-area is preferably from about 10 to about 50 $m^2/g$. The surface roughness of HF treated aggregate is characterized by the difference between BET ($N_2$) surface area and t-area, which generally ranges from about 1 to about 50 $m^2/g$, and more preferably from about 5 to about 40 $m^2/g$. After HF treatment, the aggregate still has a rough surface. The surface roughness of the HF treated aggregate is characterized by the ratio of the difference in BET ($N_2$) surface area between the aggregate after and before HF treatment to the silicon content (in weight percentage) of the original aggregate sample without HF treatment. This ratio is preferably from about 0.1 to about 10 and more preferably from about 0.5 to about 5. The weight average aggregate size measured by DCP after HF treatment is reduced generally by about 5% to about 40% compared to an untreated aggregate. A significant amount of silica can remain in the aggregate after HF treatment. The remaining silica ash content preferably ranges from about 0.05% to about 1% based on the weight of the HF treated sample. This amount of silica ash in the aggregate comprises silica ash orginating from the silicon-containing compound, and not from any carbon black-yielding feedstock. The BET surface area of the silica ash in the aggregate made after thermal treatment in air at 500° C. generally ranges from about 200 $m^2/g$ to about 1000 $m^2/g$, and preferably ranges from about 200 $m^2/g$ to about $700^2/g$. As stated earlier, any combination is possible for the various properties and the aggregate can have one, any two, any three, any four, any five, or all of the properties. Additionally, all of these aggregates can generally contain sulfur and/or nitrogen levels between about 0.1 and about 5 wt %, based on the weight of the aggregate.

The weight percent of silicon in the silicon-treated carbon black preferably ranges from about 0.1% to about 25%, and more preferably from about 0.5% to about 10%, and most preferably from about 4% to about 10% by weight or from about 8% to about 15% by weight of the aggregate. From an economical point of view, the use of less silicon is preferable to the extent that it reduces the cost to make the aggregate, provided acceptable performance characteristics are achieved. It has been found that injecting a silicon-containing compound into the carbon black reactor can result in an increase in the structure (e.g., dibutylphthalate adsorption of the crushed carbon black (CDBP)) of the product.

It is preferred that a diluent is also present in any feedstock including the silicon-containing compound. The diluent should be volatilizable and/or decomposable since it will be preferably injected into the reactor along with the silicon-containing compound. The diluent can as well also serve as a carbon black-yielding feedstock. For instance, the diluent can comprise alcohol or mixtures thereof which can serve as the carbon black-yielding feedstock as well as the diluent. The diluent is preferably capable of increasing the mass flow rate of the feedstock in which it is contained and/or is capable of lowering the temperature of the reactor at about the point of introduction of the feedstock which contains the diluent. The lower temperature assists in causing the silica domain aggregate to be finer and more numerous. The diluent can comprise a liquid and/or a gas and is preferably miscible with the silicon-containing compounds though this is not necessary. Further examples of diluents are water and aqueous based solutions. The diluent can be present in any amount and is preferably present in amounts which will increase the mass flow rate of the feedstock and/or lower the temperature of the reactor at about the point of introduction of the feedstock. The diluent can also be included in feedstocks which do not contain any silicon-containing compound, or can be introduced in a separate stage.

In a further embodiment of the present invention, an aggregate comprising a carbon phase and a metal-containing species phase can be made also using a multi-stage reactor, wherein the reactor has at least two stages for introducing the feedstocks into the reactor. The second, as well as any additional stages, are located downstream of the first stage. Each of the feedstocks introduced into the stages comprise a carbon black-yielding feedstock, a metal-containing compound, or a mixture thereof. At least one of the feedstocks comprises a carbon black-yielding feedstock and at least one of the feedstocks, which can be the same stage containing the carbon black-yielding feedstock, comprises a metal-containing compound. In addition, any one of the feedstocks further comprise a silicon-containing compound and/or boron-containing compound. The reactor is maintained at a temperature sufficient to decompose the metal-containing compound and to form a carbon phase (i.e., pyrolize the carbon black-yielding feedstock). If any silicon-containing compound or boron-containing compound is additionally present, the reactor should be also maintained at a temperature sufficient to decompose the silicon-containing compound or boron-containing compound. The aggregate formed by this process can be also considered a metal-treated carbon black or a metal-treated carbon black aggregate.

The metal-treated carbon black includes one metal-containing region concentrated at or near the surface of the aggregate (but still constituting part of the aggregate) or within the aggregate. The metal-treated carbon black thus comprises two phases, one of which is carbon and the other of which is a metal-containing species. The metal-containing species phase included in the aggregate is not attached to a carbon black aggregate like a silica coupling agent, or coated on to a pre-formed aggregate but actually is part of the same aggregate as the carbon phase. Further, it is within the bounds of the present invention to use more than one type of metal-containing compound in the feedstocks. If more than one type of metal-containing compound is used in the feedstocks, then an aggregate comprising a carbon phase and two or more different metal-containing species phases would be formed. In addition, if a silicon-containing compound is included in one of the feedstocks, then a silicon-containing species phase would also be formed as part of the same aggregate containing the carbon phase and the metal-containing species phase(s). In addition, a boron-containing compound can also be included in the feedstocks, and if present, would form a boron-containing species phase as part of the same aggregate containing the carbon phase and the metal-containing species phase. Accordingly, the metal-treated carbon black formed from the process of the present invention can have two or more different types of metal-containing species phases and/or additional non-metal species phases. The process used to make the aggregate comprising a carbon phase and a silicon-containing species phase can be substantially used to make the aggregate comprising a carbon phase and a metal-containing species phase.

Besides producing an aggregate comprising a carbon phase and a metal-containing species phase, carbon black and/or metal oxides may also result from the process of the present invention. One could consider the optional formation of one or more metal oxides and/or carbon black as co-products of the process which would also be present along with the aggregate comprising a carbon phase and a metal-containing species phase and would provide additional benefits when incorporated into elastomeric compositions.

The metal-containing species include compounds containing aluminum, zinc, magnesium, calcium, titanium, vanadium, cobalt, nickel, zirconium, tin, antimony, chromium, neodymium, lead, tellurium, barium, cesium, iron, and molybdenum. Preferably, the metal-containing species phase is an aluminum- or zinc-containing species phase. The metal-containing species include, but are not limited to, oxides of metals.

Useful volatilizable compounds (i.e., the metal-containing compounds) include any compound which is volatilizable at carbon black reactor temperatures. Examples include volatilizable or decomposable compounds containing aluminum, zinc, magnesium, calcium, titanium, vanadium, cobalt, nickel, zirconium, tin, antimony, chromium, neodymium, lead, tellurium, barium, cesium, iron, and molybdenum. Specific examples include, but are not limited to, butoxides such as Aluminum III n-Butoxide and Aluminum III s-Butoxide, and propoxides, such as Al III iso-propoxide. Examples of suitable zinc-containing compounds include, but are not limited to, zinc napthenate and zinc octoate. Other examples include, but are not limited to, magnesium ethoxide, magnesium isopropoxide, calcium propoxide, titanium isopropoxide, cobaltous napthenate, tin diethyl oxide, neodymium oxalate, and the like. The flow rate of the volatilizable compound will determine the weight percent of metal in the treated carbon black. The weight percent of the elemental metal (e.g., elemental aluminum or zinc) in the metal-treated carbon black generally ranges from about 0.1% to 25%, by weight of the aggregate, by may be adjusted to any desired level, such as up to 50% by weight, greater than 50% by weight, or up to 99% by weight of the aggregate.

Besides volatilizable compounds, decomposable metal-containing compounds which are not necessarily volatilizable can also be used to yield the metal-treated carbon black.

The aggregates made in accordance with the process of the present invention can be incorporated into elastomeric compounds which may be additionally compounded with one or more coupling agents to further enhance the properties of the elastomeric compound.

Coupling agents, as used herein, include, but are not limited to, compounds that are capable of coupling fillers such as carbon black or silica to an elastomer. Coupling agents useful for coupling silica or carbon black to an elastomer, are expected to be useful with the silicon-treated carbon blacks. Useful coupling agents include, but are not limited to, silane coupling agents such as bis(3-triethoxysilylpropyl)tetrasulfane (Si-69), 3-thiocyanatopropyl-triethoxy silane (Si-264, from Degussa AG, Germany), γ-mercaptopropyl-trimethoxy silane (A189, from Union Carbide Corp., Danbury, Conn.); zirconate coupling agents, such as zirconium dineoalkanolatodi(3-mercapto) propionato-O (NZ 66A, from Kenrich Petrochemicals, Inc., of Bayonne, N.J.); titanate coupling agents;. nitro coupling agents such as N,N'-bis(2-methyl-2-nitropropyl)-1,6-diaminohexane (Sumifine 1162, from Sumitomo Chemical Co., Japan); polyalkoxysiloxane (e.g. Zeruma from the Yokohama Rubber Co. Ltd., Japan) and mixtures of any of the foregoing. The coupling agents may be provided as a mixture with a suitable carrier, for example X50-S which is a mixture of Si-69 and N330 carbon black, available from Degussa AG.

The silicon-treated carbon black incorporated in the elastomeric compound of the present invention may be oxidized and/or combined with a coupling agent. Suitable oxidizing agents include, but are not limited to, nitric acid and ozone. Coupling agents which may be used with the oxidized carbon blacks include, but are not limited to, any of the coupling agents set forth above.

Further, the silicon-treated carbon blacks and/or metal-treated carbon blacks of the present invention may have an organic group attached.

One process for attaching an organic group to an aggregate involves the reaction of at least one diazonium salt with an aggregate in the absence of an externally applied current sufficient to reduce the diazonium salt. That is, the reaction between the diazonium salt and the aggregate proceeds without an external source of electrons sufficient to reduce the diazonium salt. Mixtures of different diazonium salts may be used in the process of the invention. This process can be carried out under a variety of reaction conditions and in any type of reaction medium, including both protic and aprotic solvent systems or slurries.

In another process, at least one diazoniium salt reacts with an aggregate in a protic reaction medium. Mixtures of different diazonium salts may be used in this process of the invention. This process can also be carried out under a variety of reaction conditions.

Preferably, in both processes, the diazonium salt is formed in situ. If desired, in either process, the carbon black product can be isolated and dried by means known in the art. Furthermore, the resultant carbon black product can be treated to remove impurities by known techniques. The various preferred embodiments of these processes are discussed below.

These processes can be carried out under a wide variety of conditions and in general are not limited by any particular condition. The reaction conditions must be such that the particular diazonium salt is sufficiently stable to allow it to react with the silicon-treated carbon black. Thus, the processes can be carried out under reaction conditions where the diazonium salt is short lived. The reaction between the diazonium salt and the silicon-treated carbon black occurs, for example, over a wide range of pH and temperature. The processes can be carried out at acidic, neutral, and basic pH. Preferably, the pH ranges from about 1 to 9. The reaction temperature may preferably range from 0° C. to 100° C.

Diazonium salts, as known in the art, may be formed for example by the reaction of primary amines with aqueous solutions of nitrous acid. A general discussion of diazonium salts and methods for their preparation is found in Morrison and Boyd, *Organic Chemistry,* 5th Ed., pp. 973–983, (Allyn and Bacon, Inc. 1987) and March, *Advanced Organic Chemistry: Reactions, Mechanisms, and Structures,* 4th Ed., (Wiley, 1992). According to this invention, a diazonium salt is an organic compound having one or more diazonium groups.

The diazonium salt may be prepared prior to reaction with the silicon-treated carbon black or, more preferably, generated in situ using techniques known in the art. In situ generation also allows the use of unstable diazonium salts such as alkyl diazonium salts and avoids unnecessary handling or manipulation of the diazonium salt. In particularly preferred processes, both the nitrous acid and the diazonium salt are generated in situ.

A diazonium salt, as is known in the art, may be generated by reacting a primary amine, a nitrite and an acid. The nitrite may be any metal nitrite, preferably lithium nitrite, sodium nitrite, potassium nitrite, or zinc nitrite, or any organic nitrite such as for example isoamylnitrite or ethylnitrite. The acid may be any acid, inorganic or organic, which is effective in the generation of the diazonium salt. Preferred acids include nitric acid, $HNO_3$, hydrochloric acid, HCl, and sulfuric acid, $H_2SO_4$.

The diazonium salt may also be generated by reacting the primary amine with an aqueous solution of nitrogen dioxide. The aqueous solution of nitrogen dioxide, $NO_2/H_2O$, provides the nitrous acid needed to generate the diazonium salt.

Generating the diazonium salt in the presence of excess HCl may be less preferred than other alternatives because HCl is corrosive to stainless steel. Generation of the diazonium salt with $NO_2/H_2O$ has the additional advantage of being less corrosive to stainless steel or other metals commonly used for reaction vessels. Generation using $H_2SO_4/NaNO_2$ or $HNO_3/NaNO_2$ are also relatively non-corrosive.

In general, generating a diazonium salt from a primary amine, a nitrite, and an acid requires two equivalents of acid based on the amount of amine used. In an in situ process, the diazonium salt can be generated using one equivalent of the acid. When the primary amine contains a strong acid group, adding a separate acid may not be necessary. The acid group or groups of the primary amine can supply one or both of the needed equivalents of acid. When the primary amine contains a strong acid group, preferably either no additional acid or up to one equivalent of additional acid is added to a process of the invention to generate the diazonium salt in situ. A slight excess of additional acid may be used. One example of such a primary amine is para-aminobenzenesulfonic acid (sulfanilic acid).

In general, diazonium salts are thermally unstable. They are typically prepared in solution at low temperatures, such as 0–5° C., and used without isolation of the salt. Heating solutions of some diazonium salts may liberate nitrogen and form either the corresponding alcohols in acidic media or the organic free radicals in basic media.

However, the diazonium salt need only be sufficiently stable to allow reaction with the silicon-treated carbon black. Thus, the processes can be carried out with some diazonium salts otherwise considered to be unstable and subject to decomposition. Some decomposition processes may compete with the reaction between the silicon-treated carbon black and the diazonium salt and may reduce the total number of organic groups attached to the silicon-treated carbon black. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes.

Reagents can be added to form the diazonium salt in situ, to a suspension of silicon-treated carbon black in the reaction medium, for example, water. Thus, a carbon black suspension to be used may already contain one or more reagents to generate the diazonium salt and the process accomplished by adding the remaining reagents.

Reactions to form a diazonium salt are compatible with a large variety of functional groups commonly found on organic compounds. Thus, only the availability of a diazonium salt for reaction with a silicon-treated carbon black limits the processes of the invention.

The processes can be carried out in any reaction medium which allows the reaction between the diazonium salt and the silicon-treated carbon black to proceed. Preferably, the reaction medium is a solvent-based system. The solvent may be a protic solvent, an aprotic solvent, or a mixture of solvents. Protic solvents are solvents, like water or methanol, containing a hydrogen attached to an oxygen or nitrogen and thus are sufficiently acidic to form hydrogen bonds. Aprotic solvents are solvents which do not contain an acidic hydrogen as defined above. Aprotic solvents include, for example, solvents such as hexanes, tetrahydrofuran (THF), acetonitrile, and benzonitrile. For a discussion of protic and aprotic solvents see Morrison and Boyd, *Organic Chemistry*, 5th Ed., pp. 228–231, (Allyn and Bacon, Inc. 1987).

The processes are preferably carried out in a protic reaction medium, that is, in a protic solvent alone or a mixture of solvents which contains at least one protic solvent. Preferred protic media include, but are not limited to water, aqueous media containing water and other solvents, alcohols, and any media containing an alcohol, or mixtures of such media.

The reaction between a diazonium salt and a silicon-treated carbon black can take place with any type of silicon-treated carbon black, for example, in fluffy or pelleted form. In one embodiment designed to reduce production costs, the reaction occurs during a process for forming silicon-treated carbon black pellets. For example, a silicon-treated carbon black product of the invention can be prepared in a dry drum by spraying a solution or slurry of a diazonium salt onto a silicon-treated carbon black. Alternatively, the silicon-treated carbon black product can be prepared by pelletizing a silicon-treated carbon black in the presence of a solvent system, such as water, containing the diazonium salt or the reagents to generate the diazonium salt in situ. Aqueous solvent systems are preferred. Accordingly, another embodiment provides a process for forming a pelletized silicon-treated carbon black comprising the steps of: introducing a silicon-treated carbon black and an aqueous slurry or solution of a diazonium salt into a pelletizer, reacting the diazonium salt with the silicon-treated carbon black to attach an organic group to the silicon-treated carbon black, and pelletizing the resulting silicon-treated carbon black having an attached organic group. The pelletized silicon-treated carbon black product may then be dried using conventional techniques.

In general, the processes produce inorganic by-products, such as salts. In some end uses, such as those discussed below, these by-products may be undesirable. Several possible ways to produce a silicon-treated carbon black product without unwanted inorganic by-products or salts are as follows:

First, the diazonium salt can be purified before use by removing the unwanted inorganic by-product using means known in the art. Second, the diazonium salt can be generated with the use of an organic nitrite as the diazotization agent yielding the corresponding alcohol rather than an inorganic salt. Third, when the diazonium salt is generated from an amine having an acid group and aqueous $NO_2$, no inorganic salts are formed. Other ways may be known to those of skill in the art.

In addition to the inorganic by-products, a process may also produce organic by-products. They can be removed, for example, by extraction with organic solvents. Other ways of obtaining products without unwanted organic by-products may be known to those of skill in the art and include washing or removal of ions by reverse osmosis.

The reaction between a diazonium salt and a silicon-treated carbon black forms a silicon-treated carbon black product having an organic group attached to the silicon-treated carbon black. The diazonium salt may contain the organic group to be attached to the silicon-treated carbon black. It may be possible to produce the silicon-treated carbon black products of this invention by other means known to those skilled in the art.

The organic group may be an aliphatic group, a cyclic organic group, or an organic compound having an aliphatic portion and a cyclic portion. As discussed above, the diazonium salt employed in the processes can be derived from a primary amine having one of these groups and being capable of forming, even transiently, a diazonium salt. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl, and the like), and heteroaryl groups (imidazolyl, pyrazolyl, pyridinyl, thienyl, thiazolyl, furyl, indolyl, and the like). As the steric hinderance of a substituted organic group increases, the number of organic groups attached to the silicon-treated carbon black from the reaction between the diazonium salt and the silicon-treated carbon black may be diminished.

When the organic group is substituted, it may contain any functional group compatible with the formation of a diazonium salt. Preferred functional groups include, but are not limited to R, OR, COR, COOR, OCOR, carboxylate salts such as COOLi, COONa, COOK, COO$^-$NR$_4^+$, halogen CN, NR$_2$, SO$_3$H, sulfonate salts such as SO$_3$Li, SO$_3$Na, SO$_3$K, SO$_3^-$NR$_4^+$, OSO$_3$H, OSO$_3^-$ salts, NR(COR), CONR$_2$, NO$_2$, PO$_3$H$_2$, phosphonate salts such as PO$_3$HNa and PO$_3$Na$_2$, phosphate salts such as OPO$_3$HNa and OPO$_3$Na$_2$, N=NR, NR$_3^+$X$^-$, PR$_3^+$X$^-$, S$_k$R, SSO$_3$H, SSO$_3^-$ salts, SO$_2$NRR', SO$_2$SR, SNNR', SNQ, SO$_2$NQ, CO$_2$NQ, S-(1,4-piperazinediyl)-SR, 2-(1,3-dithainyl) 2-(1,3-dithiolanyl), SOR, and SO$_2$R. R and R', which can be the same or different, are independently hydrogen, branched or unbranched C$_1$–C$_{20}$ substituted or unsubstituted, saturated or unsaturated hydrocarbon, e.g., alkyl, alkenyl, alkynyl, substituted or unsubstituted aryl, substituted or unsubstituted heteroaryl, substituted or unsubstituted alkylaryl, or substituted or unsubstituted arylalkyl. The integer k ranges from 1–8 and preferably from 2–4. The anion X$^-$ is a halide or an anion derived from a mineral or organic acid. Q is (CH$_2$)$_w$, (CH$_2$)$_x$O(CH$_2$)$_z$, (CH$_2$)$_x$NR(CH$_2$)$_z$, or (CH$_2$)$_x$S(CH$_2$)$_z$, where w is an integer from 2 to 6 and x and z are integers from 1 to 6.

A preferred organic group is an aromatic group of the formula A$_y$Ar—, which corresponds to a primary amine of the formula A$_y$ArNH$_2$. In this formula, the variables have the following meanings: Ar is an aromatic radical such as an aryl or heteroaryl group. Preferably, Ar is selected from the group consisting of phenyl, naphthyl, anthracenyl, phenanthrenyl, biphenyl, pyridinyl, benzothiadiazolyl, and benzothiazolyl; A is a substituent on the aromatic radical independently selected from a preferred functional group described above or A is a linear, branched or cyclic hydrocarbon radical (preferably containing 1 to 20 carbon atoms), unsubstituted or substituted with one or more of those functional groups; and y is an integer from 1 to the total number of —CH radicals in the aromatic radical. For instance, y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl. In the above formula, specific examples of R and R' are NH$_2$—C$_6$H$_4$—, CH$_2$CH$_2$—CH$_6$H$_4$—NH$_2$, CH$_2$—C$_6$H$_4$—NH$_2$, and C$_6$H$_5$.

Another preferred set of organic groups which may be attached to the silicon-treated carbon black are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts or acidic groups. The organic groups, therefore, include groups derived from organic acids. Preferably, when it contains an ionizable group forming an anion, such an organic group has a) an aromatic group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Preferably, the aromatic group of the organic group is directly attached to the silicon-treated carbon black. The aromatic group may be further substituted or unsubstituted, for example, with alkyl groups. More preferably, the organic group is a phenyl or a naphthyl group and the acidic group is a sulfonic acid group, a sulfinic acid group, a phosphonic acid group, or a carboxylic acid group. Examples of these acidic groups and their salts are discussed above. Most preferably, the organic group is a substituted or unsubstituted sulfophenyl group or a salt thereof; a substituted or unsubstituted (polysulfo) phenyl group or a salt thereof; a substituted or unsubstituted sulfonaphthyl group or a salt thereof; or a substituted or unsubstituted (polysulfo)naphthyl group or a salt thereof. A preferred substituted sulfophenyl group is hydroxysulfophenyl group or a salt thereof.

Specific organic groups having an ionizable functional group forming an anion (and their corresponding primary amines) are p-sulfophenyl (p-sulfanilic acid), 4-hydroxy-3-sulfophenyl (2-hydroxy-5-amino-benzenesulfonic acid), and 2-sulfoethyl (2-aminoethanesulfonic acid). Other organic groups having ionizable functional groups forming anions can also be used.

Amines represent examples of ionizable functional groups that form cationic groups. For example, amines may be protonated to form ammonium groups in acidic media. Preferably, an organic group having an amine substituent has a pKb of less than 5. Quaternary ammonium groups (—NR$_3^+$) and quaternary phosphonium groups (—PR$_3^+$) also represent examples of cationic groups. Preferably, the organic group contains an aromatic group such as a phenyl or a naphthyl group and a quaternary ammonium or a quaternary phosphonium group. The aromatic group is preferably directly attached to the carbon black. Quaternized cyclic amines, and even quaternized aromatic amines, can also be used as the organic group. Thus, N-substituted pyridinium compounds, such as N-methyl-pyridyl, can be used in this regard. Examples of organic groups include, but are not limited to, (C$_5$H$_4$N)C$_2$H$_5^+$, C$_6$H$_4$(NC$_5$H$_5$)$^+$, $^C$$_6$H$_4$COCH$_2$N(CH$_3$)$_3^+$, C$^6$H$_4$COCH$_2$(NC$_5$H$_5$)$^+$, $^{(C}$$_5$H$_4$N)CH$_3^+$, $^{and\ C}$$_6$H$_4$CH$_2$N(CH$_3$)$_3^+$.

An advantage of the silicon-treated carbon black products having an attached organic group substituted with an ionic or an ionizable group is that the silicon-treated carbon black product may have increased water dispersibility relative to the corresponding untreated carbon black. Water dispersibility of a silicon-treated carbon black product increases with the number of organic groups attached to the silicon-treated carbon black having an ionizable group or the number of ionizable groups attached to a given organic group. Thus, increasing the number of ionizable groups associated with the silicon-treated carbon black product should increase its water dispersibility and permits control of the water dispersibility to a desired level. It can be noted that the water dispersibility of a silicon-treated carbon black product containing an amine as the organic group attached to the silicon-treated carbon black may be increased by acidifying the aqueous medium.

Because the water dispersibility of the silicon-treated carbon black products depends to some extent on charge stabilization, it is preferable that the ionic strength of the aqueous medium be less than 0.1 molar. More preferably, the ionic strength is less than 0.01 molar.

When such a water dispersible silicon-treated carbon black product is prepared, it is preferred that the ionic or ionizable groups be ionized in the reaction medium. The resulting product solution or slurry may be used as is or diluted prior to use. Alternatively, the silicon-treated carbon black product may be dried by techniques used for conventional carbon blacks. These techniques include, but are not limited to, drying in ovens and rotary kilns. Overdrying, however, may cause a loss in the degree of water dispersibility.

In addition to their water dispersibility, silicon-treated carbon black products having an organic group substituted with an ionic or an ionizable group may also be dispersible in polar organic solvents such as dimethylsulfoxide (DMSO), and formamide. In alcohols such as methanol or ethanol, use of complexing agents such as crown ethers increases the dispersibility of silicon-treated carbon black products having an organic group containing a metal salt of an acidic group.

Aromatic sulfides encompass another group of preferred organic groups. Silicon-treated carbon black products having aromatic sulfide groups are particularly useful in rubber compositions. These aromatic sulfides can be represented by the formulas $Ar(CH_2)_qS_k(CH_2)_rAr'$ or $A—(CH_2)_qS_K(CH_s)_rAr''$ wherein Ar and Ar' are independently substituted or unsubstituted arylene or heteroarylene groups, Ar'' is an aryl or heteroaryl group, k is 1 to 8 and q and r are 0–4. Substituted aryl groups would include substituted alkylaryl groups. Preferred arylene groups include phenylene groups, particularly p-phenylene groups, or benzothiazolylene groups. Preferred aryl groups include phenyl, naphthyl and benzothiazolyl. The number of sulfurs present, defined by k preferably ranges from 2 to 4. Preferred silicon-treated carbon black products are those having an attached aromatic sulfide organic group of the formula $—(C_6H_4)—S_k—(C_6H_4)—$, where k is an integer from 1 to 8, and more preferably where k ranges from 2 to 4. Particularly preferred aromatic sulfide groups are bis-para-$(C_6H_4)$-$S_2$-$(C_6H_4)$- and para-$(C_6H_4)$—$S_2$—$(C_6H_5)$. The diazonium salts of these aromatic sulfide groups may be conveniently prepared from their corresponding primary amines, $H_2N—Ar—S_k—Ar^1—NH_2$ or $H_2N—Ar—S_k—Ar''$. Preferred groups include dithiodi-4,1-phenylene, tetrathiodi-4,1-phenylene, phenyldithiophenylene, dithiodi-4,1-(3-chlorophenylene), —(4-$C_6H_4$)—S—S—(2-$C_7H_4$NS), —(4-$C_6H_4$)—S—S—(4-$C_6H_4$)—OH, -6-(2—$C_7H_3$NS)—SH, -(4—$C_6H$)—$CH_2CH_2$—S—S—$CH_2CH_2$—(4—$C_6H_4$)—, (4—$C_6H_4$)—$CH_2CH_2$—S—S—$CH_2CH_2$—(4—$C_6H_4$)—, -(2—$C_6H_4$)—S—S—(2—$C_6H_4$)—, -(3—$C_6H_4$)—S—S—(3—$C_6H_4$)—, -6-($C_6H_3N_1S$), -6-(2—$C_7H_3$NS)—S—NRR' where RR' is —$CH_2CH_2OCH_2CH_2$—, -(4—$C_6H_4$)—S—S—S—(4—$C_6H_4$)—, -(4—$C_6H_4$)—CH=$CH_2$, -(4—$C_6H_4$)—S—$SO_3H$, -(4—$C_6H_4$)—$SO_2NH$—(4—$C_6H_4$)—S—S—(4—$C_6H_4$)—$NHSO_2$—(4—$C_6H_4$)—, -6-(2—$C_7H_3$NS)—S—S—2—(6—$C_7H_3$NS)—, —(4—$C_6H_4$)—S—$CH_2$—(4—$C_6H_4$)—, —(4—$C_6H_4$)—$SO_2$—S—(4—$C_6H_4$)—, —(4—$C_6H_4$)—$CH_2$—S—$CH_2$—(4—$C_6H_4$)—, —(3—$C_6H_4$)—$CH_2$—S—$CH_2$—(3—$C_6H_4$)—, —(4—$C_6H_4$)—$CH_2$—S—S—$CH_2$—(4—$C_6H_4$)—, —(3—$C_6H_4$)—$CH_2$—S—S—$CH_2$—(3—$C_6H_4$)—, —(4—$C_6H_4$)—S—NRR' where RR' is —$CH_2CH_2OCH_2CH_2$—, —(4—$C_6H_4$(—$SO_2NH$—$CH_2CH_2$—S—S—$CH_2CH_2$—$NHSO_2$-(4-$C_6H_4$)-, —(4-$C_6H_4$)-2-(1,3dithianyl;), and —(4-$C_6H_4$)—S—(1,4-piperizinedyl)—S—(4—$C_6H_4$)—.

Another preferred set of organic groups which may be attached to the carbon black are organic groups having an aminophenyl, such as $(C_6H_4)—NH_2$, $(C_6H_4)—CH_2—(C_6H_4)—NH_2$, $(C_6H_4)—SO_2—(C_6H_4)—NH_2$. Preferred organic groups also include aromatic sulfides, represented by the formulas $Ar—S_n—Ar'$ or $Ar—S_n—Ar''$, wherein Ar and Ar' are independently arylene groups, Ar'' is an aryl and n is 1 to 8. Methods for attaching such organic groups to carbon black are discussed in U.S. Pat. Nos. 5,554,739; 5,559,169; U.S. Patent Application Ser. No. 08/356,660, now abandoned, and U.S. Patent Application Ser. No. 08/572,525, now U.S. Pat. No. 5,851,280; and PCT Published Patent Application Ser. Nos. WO 96/18688 and WO 96/18696, all of the disclosures of which are fully incorporated by reference herein.

As stated earlier, the silicon-treated carbon black or metal-treated carbon black may also be modified to have at least one organic group attached to the silicon-treated carbon black. Alternatively, a mixture of silicon-treated carbon black and/or a metal-treated carbon black with a modified carbon black having at least one attached organic group may be used.

Furthermore, it is within the bounds of this application to also use a mixture of silica and silicon-treated carbon black and/or metal-treated carbon black. Also, any combination of additional components with the silicon-treated carbon black or metal-treated carbon black may be used such as one or more of the following:

a) silicon-treated carbon black with an attached organic group optionally treated with silane coupling agents;

b) modified carbon black having an attached organic group;

c) carbon black at least partially coated with silica;

d) silica;

e) modified silica, for example, having an attached coupling group, and/or f) carbon black.

The term "silica" includes, but is not limited to, silica, precipitated silica, amorphous silica, vitreous silica, fumed silica, fused silica, silicates (e.g., alumino silicates) and other Si containing fillers sucha s clay, talc, wollastonite, etc. Silicas are commercially available from such sources as Cabot Corporation under the Cab-O-Sil® tradename; PPG Industries under the Hi-Sil and Ceptane tradenames; Rhone-Poulenc under the Zeosil tradename; and Degussa AG under the Ultrasil and Coupsil tradenames.

The elastomeric compounds of the present invention may be prepared from the silicon-treated carbon blacks and/or metal-treated carbon blacks by compounding with any elastomer including those useful for compounding a carbon black.

Any suitable elastomer may be compounded with the silicon-treated carbon blacks and/or metal-treated carbon blacks to provide the elastomeric compounds of the present invention. Such elastomers include, but are not limited to, homo- or co-polymers of 1,3 butadiene, styrene, isoprene, isobutylene, 2,3-dimethyl-1,3-butadiene, acrylonitrile, ethylene, and propylene Preferably, the elastomer has a glass transition temperature (Tg) as measured by differential scanning colorimetry (DSC) ranging from about −120° C. to about 0° C. Examples include, but are not limited, styrene-butadiene rubber (SBR), natural rubber, polybutadiene, polyisoprene, and their oil-extended derivatives. Blends of any of the foregoing may also be used.

Among the rubbers suitable for use with the present invention are natural rubber and its derivatives such as chlorinated rubber. The silicon-treated carbon black products or metal-treated carbon black products of the invention may also be used with synthetic rubbers such as: copolymers of from about 10 to about 70 percent by weight of styrene and from about 90 to about 30 percent by weight of butadiene suchas copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl 2-vinylpyridine, 5-ethyl-2-vinylpyridine, 2-methyl-5-vinylpyridine, alkyl-substituted acrylates, vinyl ketone, methyl isopropenyl ketone, methyl vinyl either, alphamethylene carboxylic acids and the esters and amides thereof such as acrylic acid and dialkylacrylic acid amide; also suitable for use herein are copolymers of ethylene and other high alpha olefins such as propylene, butene-1 and pentene-1.

The rubber compositions of the present invention can therefore contain an elastomer, curing agents, reinforcing filler, a coupling agent, and, optionally, various processing aids, oil extenders, and antidegradents. In addition to the examples mentioned above, the elastomer can be, but is not limited to, polymers (e.g., homopolymers, copolymers, and terpolymers) manufactured from 1,3 butadiene, styrene, isoprene, isobutylene, 2,3-dimethyl-1,3 butadiene, acrylonitrile, ethylene, propylene, and the like. It is preferred that these elastomers have a glass transition point (Tg), as measured by DSC, between −120° C. and 0° C. Examples of such elastomers include poly)butadiene), poly)styrene-co-butadiene), and poly(isoprene).

Elastomeric compositions disclosed in the present invention include, but are not limited to, vulcanized compositions (VR), thermoplastic vulcanizates (TPV), thermoplastic elastomers (TPE) and thermoplastic polyolefins (TPO). TPV, TPE, and TPO materials are further classified by their ability to be extruded and molded several times without loss of performances characteristics.

The elastomeric compositions may include one or more curing agents such as, for example, sulfur, sulfur donors, activators, accelerators, peroxides, and other systems used to effect vulcanization of the elastomer composition.

The resultant elastomeric compounds containing the aggregates of the present invention and optionally containing one or more coupling agents may be used for various elastomeric products such as a tread compound, undertread compound, sidewall compound, wire skim compound, innerliner compound, bead, apex, any compound used in carcass and other components for vehicle tires, industrial rubber products, seals, timing belts, power transmission belting, and other rubber goods.

The elastomeric compositions of the present invention preferably improve rolling resistance and/or wet traction, especially for tire compounds compared to the same elastomeric compositions without any aggregate of the present invention. Preferably, the increase for either property is at least 3%, more preferably at least 8%, and more preferably from about 3% to about 20% compared to the same elastomeric composition containing carbon black and not any aggregate of the present invention.

The present invention will be further clarified by the following examples, which are intended to be purely exemplary of the present invention.

EXAMPLES

Example 1

Silicon-treated carbon blacks according to the present invention were prepared using a pilot scale reactor generally as described above, and as depicted in the FIGURE having the dimensions set forth below: $D_1$=7.25 inches, $D_2$=4.5 inches, $D_3$=5.3 inches, $D_4$=13.5 inches, $L_1$=24 inches, $L_2$=12 inches, $L_2'$=45 inches (for Example OMTS-CB-A', wherein OMTS-CB is defined as octamethylcylotetrasiloxane—carbon black) and $L_2'$=25 inches (for Examples OMTS-CB-B', C', D', and E') and Q=8.583 feet (for Examples OMTS-CB-A', B' and C'), Q=6.5 feet (for Examples OMTS-CB-D' and E'). The reaction conditions set forth in Table 1 below, were employed.

As shown in the FIGURE, a first feedstock was introduced at point 6 and a second feed stock was introduced at point 7. The first feedstock contained a hydrocarbon (i.e. carbon black-yielding feedstock) and the second feedstock contained hydrocarbon and OMTS (i.e. a silicon-containing compound), namely octamethyl-cyclotetrasilioxane. This compound is sold as "D4" by Dow Corning Corporation, Midland, Mich. The resultant silicon-treated carbon black is identified herein as OMTS-CB.

Since changes in reactor temperature are known to alter the surface area of the carbon black, and reactor temperature is very sensitive to the total flow rate of the feedstock in the injection zone (zone 3 in the FIGURE), the feedstock flow rate was adjusted downward to approximately compensate for the introduction of the volatilizable silicon-containing compound. This results in an approximately constant external surface area (as measured by t area) for the resultant silicon-treated carbon blacks. All other conditions were maintained as necessary for manufacturing N234 carbon black. A structure control additive (potassium acetate solution) was injected into the feedstock to maintain the specification structure of the N234 carbon black. The flow rate of this additive was matintained constant in making the silicon-treated carbon blacks described throughout the following examples.

The BET ($N_2$) surface area was measured following the procedure described in ASTM D4820-method B.

The external surface are (t-area) was measured following the samples preparation and measurement procedure described in ASTM D5816. For this measurement, the nitrogen adsorption isotherm was extended up to 0.55 relative pressure.

The relative pressure is the pressure (P) divided by the saturation pressure ($P_0$) (the pressure at which the nitrogen condenses). The adsorption layer thickness ($t_1$) was then calculated using the relation:

$$t_1 = \frac{13.99}{\sqrt{0.034 - \log(P/P_0)}}$$

The volume (V) of nitrogen adsorbed was then plotted against $t_1$. A straight line was then fitted through the data points for $t_1$ values between 3.9 and 6.2 Angstroms. The t-area was then obtained from the slope of this line as follows:

$$t\text{-area}, m^2/gm = 15.47 \times \text{slope}$$

The HF (hydrofluoric acid) treatment of the samples were carried out using 5% v/v concentration of HF at boiling temperature for 1 h. After the treatment, the samples were washed on a filter 20 times with water and thereafter the washed aggregates were dried in preparation for further analysis.

The ash content of the aggregates was measured according to the procedure described in ASTM D1506-method A.

The aggregate size of the filler was measured by means of DCP according to the method described in L. E. Oppenheimer, J. Colloid and Interface Science, 92, 350 (1983), incorporated herein by reference.

TABLE 1

| OMTS-CB- | CONDITIONS | | | | |
|---|---|---|---|---|---|
| | A' | B' | C' | D' | E' |
| Air Rate kscfh* | 60 | 60 | 60 | 60 | 60 |
| Gas Rate, kscfh | 4.9 | 4.9 | 4.9 | 4.9 | 4.9 |
| Feedstock Rate at point 6, lbs/hr | 351 | 373 | 381 | 488 | 284 |
| Feedstock Rate at point 7, lbs/hr | 287 | 305 | 312 | 163 | 418 |
| OMTS rate at point 7, lbs/hr | 22.2 | 50.2 | 50.2 | 46.6 | 46 |

*wherein kscfh is defined as thousand standard cubic feet per hour

The analytical properties of the silicon-treated carbon black are provided in Table 2. The various formulations and the mixing procedure used to produce the rubber compound using these silicon-treated carbon blacks are described in Tables 3 and 4. The performance of the silicon-treated carbon blacks are described in Table 5. It is seen that the aggregates of the present invention made using the process described above result in a 6–10 % improvement (compared to conventional carbon black) in wet skid resisstance as measured by the British Portable Skid Tester.

The wet skid resistance (or wet traction) was measured by means of an improved British Portable Skid Tester (BPST) with the procedure reported by Ouyang et al. (G. B. Ouyang, N. Tokita, and C. H. Shieh, "Carbon Black Effects on Friticion Properties of Tread Compound—Using a modified ASTM-E303 Pendulum Skid Tester", presented at a meeting of Rubber Division, ACS, Denver, Colo., May 18–21, 1993). The friction coefficients are referenced to carbon black N234-filled compound (100%). The higher the number, the higher (better) is the wet skid resistance.

TABLE 2

Analytical Properties of Carbon Blacks

| Filler | Si % | BET area $m^2/g$ | ($N_2$) t-area $m^2/g$ | CDBP mL/100 g |
|---|---|---|---|---|
| N234 | 0.00 | 121.0 | 119.0 | 100.7 |
| OMTS-CB-A' | 1.99 | 139.0 | 119.6 | 94.3 |
| OMTS-CB-B' | 4.54 | 176.2 | 124.6 | 101.7 |
| OMTS-CB-C' | 3.27 | 176.2 | 123.8 | 100.6 |
| OMTS-CB-D' | 4.40 | 171.4 | 124.1 | 99.1 |
| OMTS-CB-E' | 4.40 | 168.5 | 123.8 | 100.7 |

TABLE 3

Formulation

| | N234 | D4-CB |
|---|---|---|
| SSBR (Duradene 715) | 75 | 75 |
| BR (Tacktene 1203) | 25 | 25 |
| N234 | 75 | — |
| OMTS-CB | — | 75 |
| Si 69 | — | 3 |
| Oil (Sundex 8125) | 25 | 25 |
| Zinc Oxide | 3.5 | 3.5 |
| Stearic Acid | 2 | 2 |
| Antioxidant (Flexzone 7P) | 1.5 | 1.5 |
| Wax (Sunproof Improved) | 1.5 | 1.5 |
| Durax | 1.5 | 1.5 |
| Vanax DPG | — | 1 |
| TMTD | 0.4 | 0.4 |
| Sulfur | 1.4 | 1.4 |

Dudadene 715—solution SBR from Firestone Synthetic Rubber & Latex Co., Akron, Ohio.

Tacktene 1203—Polybutadiene, from Bayer Fibres, Akron, Ohio.

Si 69—bis(3-triethoxysilylpropyl) tetrasulfide, from Degussa, AG, Germany.

Sundex 8125—oil, from R. E. Carrol Inc., Trenton, N.J.

Zince oxide—from New Jersey Zinc Co., New Jersey.

Stearic acid—from Emery Chemicals, Cincinnati, Ohio.

Flexon 7P—antioxidant, N-(1,3,-dimethyl butyl)-N'-phenyl-p-phenylene diamine, from Uniroyal Chemical Co. Middlebury, Conn.

Sunproof Improved—wax, from Uniroyal Chemical Co. Middlebury, Conn.

Durax—accelerator, N-cycloheane-2-benzothiazole sulphenamide, from R. T. Vanderbilt Co., Norwalk, Conn.

Vanax DPG—accelerator, diphenyl guanidine, from R. T. Vanderbilt Co., Norwalk, Conn.

TMTD—accelerator, tetramethyl thiuram disulfide, from Uniroyal Chemical Co. Middlebury, Conn.

Sulfur—from R. E. Carrol Inc., Trenton, N.J.

TABLE 4

Mixing Procedure for Tread Compounds of Passenger Tire

| Stage 1 | Brabender Plasti-corder EPL-V. |
| | 60 rpm, 80° C., air on, start |
| | all mixes @ 100° C. |
| 0' | Add polymer |
| 1' | Add filler, coupling agents (Preblended) |
| @ 160° C. | Add oil. |

TABLE 4-continued

Mixing Procedure for Tread Compounds of Passenger Tire

| | | |
|---|---|---|
| 7' @ 165° C. | | Dump. |
| | | Pass through open mill 3 times. |
| | | Sit at room temperature for at least 2 hrs. |
| | Stage 2 | 60 rpm, 80° C., air on, start all mixes @ 100° C. |
| 0' | | Add masterbatch from stage 1. |
| 1' | | Add ZnO, Stearic acid. |
| 3' | | Add Flexzone 7P and Wax. |
| 4', @ 165° C. | | Dump |
| | | Pass through open mill 3 times. |
| | | Sit at room temperature for at least 2 hrs. |
| | Stage 3 | 35 rpm, 80° C. air on, start all mixes @ 100° C. |
| 0' | | Add masterbatch from stage 2. |
| 1' | | Add curatives. |
| 2' | | Dump. |
| | | Pass through open mill 3 times. |

TABLE 5

Physical Properties of Vulcanizates

| | | Wet skid | tan δ | |
| | Si 69 | Resistance | | |
| Filler | phr | % | 0° C. | 70° C. |
|---|---|---|---|---|
| N234 | 0.0 | 100 | 0.470 | 0.260 |
| OMTS-CB-A' | 3.0 | 110 | 0.414 | 0.195 |
| OMTS-CB-B' | 3.0 | 110 | 0.387 | 0.162 |
| OMTS-CB-C' | 3.0 | 108 | 0.394 | 0.173 |
| OMTS-CB-D' | 3.0 | 110 | 0.370 | 0.156 |
| OMTS-CB-E' | 3.0 | 106 | 0.383 | 0.146 |

Example 2

Aggregates according to the present invention were prepared using a pilot scale reactor generally as described above, and as depicted in the FIGURE having the dimensions set forth below:

$D_1$=7.25 inches, $D_2$=4.5 inches, $D_3$=5.3 inches, $D_4$=13.5 inches, $L_1$=24 inches, $L_2$ =12 inches, $L_2$=29 inches, Q=6.5 feet. The reaction conditions set forth in Table 1 below, were employed.

As shown in the FIGURE, a first feedstock was introduced at point 6 and a second feed stock was introduced at point 7. The first feedstock contained a hydrocarbon (i.e. carbon black-yielding feedstock) and the second feedstock contained alcohol, namely iso-propanol and OMTS (i.e. a silicon-containing compound), namely octamethyl-cyclotetrasilioxane or octamethyl-cyclotetrasilioxane alone. This compound is sold as "D4" by Dow Corning Corporation, Midland, Mich. The resultant multiphase aggregate is identified herein as MPCS 1–4.

Since charges in reactor temperature are known to alter the surface area of the carbon black, and reactor temperature is very sensitive to the total flow rate of the feedstock in the injection zone (zone 3 in the FIGURE), the feedstock flow rate was adjusted to approximately compensate for the introduction of the volatilizable silicon-containing compound. This results in an approximately constant external surface area (as measured by t area) for the resultant silicon-treated carbon blacks. All other conditions were maintained as necessary for manufacturing N234 carbon black. A structure control additive (potassium acetate solution) was injected into the feedstock to maintain the specification structure of the N234 carbon black. The flow rate of this additive was maintained constant in making the multiphase aggregates described throughout the following examples.

TABLE 6

CONDITIONS

| | MPCS-1 | MPCS-2 | MPCS-3 | MPCS-4 |
|---|---|---|---|---|
| Air Rate nm³/h* | 1605 | 1606 | 1605 | 1607 |
| Gas Rate nm³/h | 132 | 133 | 134 | 133 |
| Feedstock rate at point 6, kg/hr | 266 | 298 | 334 | 346 |
| OMTS rate at point 7, kg/hr | 87.2 | 44 | 51 | 29.1 |
| Feedstock (Iso-propanol) rate at point 7, kg/hr | 0 | 0 | 49 | 69 |

*wherein nm³/h is defined as cubic nanometer per hour

The analytical properties of the silicon-treated carbon black are provided in Table 7. The various formulations and the mixing procedure used to produce the rubber compound using these silicon-treated carbon blacks are described in Tables 8 and 9. The performance of the silicon-treated carbon blacks are described in Table 10. It is seen that the aggregates of the present invention made using the process described above result in a 6–10% improvement (compared to conventional carbon black) in wet skid resistance as measured by the British Portable Skid Tester.

TABLE 7

Analytical Properties of Carbon Blacks as is

| Filler | % Si | BET area m²/g | t-area m²/g | CDBP ml/100 g | BET of ash m²/g |
|---|---|---|---|---|---|
| N234 | 0.02 | 122.2 | 120.4 | 103 | N/A |
| MPCS-1 | 14.8 | 154.2 | 122.7 | 103.8 | 437 |
| MPCS-2 | 8.1 | 149 | 124.1 | 102.8 | 504 |
| MPCS-3 | 8.2 | 152.6 | 124.7 | 105 | 601 |
| MPCS-4 | 4.9 | 142.9 | 126.5 | 103.4 | 579 |
| MPCS-5* | 4.8 | 154.3 | 121.4 | 100.3 | 725 |

*MPCS-5 made by introducing all carbon black-yielding feedstock and all silicon-containing compound in to only first stage of the reactor.

TABLE 8

Analytical Properties of Carbon Blacks after HF treatment

| Filler | BET area m²/g | t-area m²/g | % silica ash |
|---|---|---|---|
| N234 | 121.7 | 122.2 | 0.02 |
| MPCS-1 | 166.9 | 149.4 | 0.36 |
| MPCS-2 | 157.9 | 142.1 | 0.31 |
| MPCS-3 | 159.7 | 150.4 | 0.17 |
| MPCS-4 | 143.6 | 136.6 | 0.07 |
| MPCS-5* | 310.1 | 154.8 | 1.50 |

TABLE 9

Formulation

| | N234 | D4-CB |
|---|---|---|
| SSBR (Duradene 715) | 75 | 75 |
| BR (Tacktene 1203) | 25 | 25 |
| N234 | 80 | — |
| MPCS filler | — | 80 |
| Si 69 | — | variable |

TABLE 9-continued

Formulation

| | N234 | D4-CB |
|---|---|---|
| Oil (Sundex 8125) | 32.5 | 32.5 |
| Zinc Oxide | 3.5 | 3.5 |
| Stearic Acid | 2 | 2 |
| Antioxident (Flexzone 7P) | 2 | 1.5 |
| Wax (Sunproof Improved) | 2.5 | 1.5 |
| Durax* | 1.35 | 1.5 |
| Vanax* DPG | — | 0.5 |
| TBzTD | — | 0.25 |
| Sulfur | 1.35 | 1.4 |

TBzTD - accelerator, tetrabenzyl thiuram disulfide, from Uniroyal Chemical Co. Middlebury, CT

TABLE 10

Mixing Procedure for Tread Compounds of Passenger Tire

| Stage 1 | | Brabender Plasti-corder EPL-V. 60 rpm, 80° C., air on, start all mixes @ 100° C. |
|---|---|---|
| 0' | | Add polymer |
| 1' | | Add filler, coupling agents (Preblended) |
| | @ 160° C. | Add oil. |
| 7' | @ 165° C. | Dump. Pass through open mill 3 times. Sit at room temperature for at least 2 hrs. |
| Stage 2 | | 60 rpm, 80° C., air on, start all mixes @ 100° C. |
| 0' | | Add masterbatch from stage 1. |
| 1' | | Add ZnO, Stearic acid. |
| 3' | | Add Flexzone 7P and Wax. |
| 4', | @ 165° C. | Dump Pass through open mill 3 times. Sit at room temperature for at least 2 hrs. |
| Stage 3 | | 35 rpm, 80° C. air on, start all mixes @ 100° C. |
| 0' | | Add masterbatch from stage 2. |
| 1' | | Add curatives. |
| 2' | | Dump. Pass through open mill 3 times. |

TABLE 11

Physical Properties of Vulcanizates

| Filler | Si 69 Phr | Wet skid Resistance, % | Tan δ @ 70° C. |
|---|---|---|---|
| N234 | 0 | 100 | 0.325 |
| MPCS-1 | 3.2 | 110 | 0.163 |
| MPCS-2 | 2.4 | 107 | 0.192 |
| MPCS-3 | 2.4 | 107 | 0.149 |
| MPCS-4 | 2.0 | 106 | 0.190 |
| MPCS-5 | 2.0 | 103 | 0.168 |

As seen in the above Tables, the samples of the present invention had better properties, such as improved skid resistance over elastomeric compositions containing multiphase aggregates made using a single stage addition.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An aggregate comprising a carbon phase and a silicon-containing species phase, wherein said aggregate is characterized by at least one of the following characteristics:

a) a difference between BET ($N_2$) surface area and t-area of from about 2 to about 100 $m^2/g$;

b) a difference between BET ($N_2$) surface area and t-area of from about 1 to about 30 $m^2/g$ after HF treatment;

c) a ratio of from about 0.1 to about 10 based on 1) the difference in BET ($N_2$) surface area between the aggregate after and before HF treatment to 2) weight percentages of silicon content in said aggregate without HF treatment;

d) a weight average aggregate size measured by DCP after HF treatment is reduced by about 5% to about 40% compared to weight average aggregate size without HF treatment;

e) a silica ash content in said aggregate of from about 0.05% to about 1% based on the weight of said aggregate after HF treatment and based on ash resulting from silicon-containing compound; and f) A BET surface area of silica ash in said aggregate of from about 200 $m^2/g$ to about 700 $m^2/g$ wherein the silicon-containing species phase is present primarily at the surface of the aggregate.

2. The aggregate of claim 1, wherein said silicon-containing species phase has a visible surface area of from 64.8 $m^2/g$ to 105.3 $m^2/g$.

3. The aggregate of claim 1, wherein said aggregate is characterized by at least two of the characteristics.

4. The aggregate of claim 1, wherein the aggregate is characterized by at least three of the characteristics.

5. The aggregate of claim 1, wherein the aggregate is characterized by at least four of the characteristics.

6. The aggregate of claim 1, wherein the aggregate is characterized by a) and b).

7. The aggregate of claim 1, wherein the aggregate is characterized by a) and c).

8. The aggregate of claim 1, wherein the aggregate is characterized by a).

9. The aggregate of claim 1, wherein the aggregate is characterized by b).

10. The aggregate of claim 1, wherein the aggregate is characterized by c).

11. The aggregate of claim 1, wherein the aggregate is characterized by d).

12. The aggregate of claim 1, wherein the aggregate is characterized by e).

13. The aggregate of claim 1, wherein the aggregate is characterized by a) and has a BET surface area of silica ash is said aggregate of from about 200 $m^2/g$ to about 700 $m^2/g$.

14. The aggregate of claim 1, wherein the aggregate has a t-area above about 100 $m^2/g$ and the difference between BET ($N_2$) and t-area is from about 10 to about 50 $m^2/g$.

15. The aggregate of claim 1, wherein when the aggregate is HF treated, the aggregate has a difference between BET ($N_2$) and t-area of from about 5 to about 40 $m^2/g$.

16. The aggregate of claim 1, wherein the ratio for c) is from about 0.1 to about 5.

17. The aggregate of claim 1, wherein the BET surface area of silica ash in said aggregate is from about 200 $m^2/g$ to about 700 $m^2/g$.

18. The aggregate of claim 1, wherein said aggregate has an elemental silicon content of from about 0.1 to about 25 wt %, based on the weight of the aggregate.

19. The aggregate of claim 1, wherein said aggregate has an elemental silicon content of from about 4 to about 10 wt %, based on the weight of the aggregate.

20. The aggregate of claim 1, wherein said aggregate has an elemental silicon content of from about 8 to about 15 wt %, based on the weight of the aggregate.

21. The aggregate of claim 1, wherein when said aggregate is incorporated into an elastomeric composition, the wet skid resistance of the elastomeric composition is improved compared to the same elastomeric composition having carbon black.

22. The aggregate of claim 1, wherein said aggregate imparts to an elastomer poorer abrasion resistance, comparable or higher loss tangent at low temperature and a lower loss tangent at high temperature, compared to carbon black.

23. The aggregate of claim 1, wherein when said aggregate is incorporated into an elastomeric composition, the rolling resistance of the elastomeric composition is improved compared to the same elastomeric composition having carbon black.

24. An aggregate comprising a carbon phase and a silicon-containing species phase, wherein said aggregate is characterized by at least one of the following characteristics:
   a) a difference between BET ($N_2$) surface area and t-area of from about 2 to about 100 $m^2/g$;
   b) a difference between BET ($N_2$) surface area and t-area of from about 1 to about 50 $m^2/g$ after HF treatment;
   c) a ratio of from about 0.1 to about 10 based on 1) the difference in BET ($N_2$) surface area between the aggregate after and before HF treatment to 2) weight percentages of silicon content in said aggregate without HF treatment;
   d) a weight average aggregate size measured by DCP after HF treatment is reduced by about 5% to about 40% compared to weight average aggregate size without HF treatment;
   e) a silica ash content in said aggregate of from about 0.05% to about 1% based on the weight of said aggregate after HF treatment and based on ash resulting from silicon-containing compound; and
   f) A BET surface area of silica ash in said aggregate of from about 200 $m^2/g$ to about 700 $m^2/g$ wherein said aggregate has silanol groups located at the surface of the aggregate.

25. The aggregate of claim 24, wherein said silanol groups are present in an amount of 0.16 Mmol/g to 0.26 Mmol/g.

26. The aggregate of claim 24, wherein said aggregate is characterized by at least two of the characteristics.

27. The aggregate of claim 24, wherein the aggregate is characterized by at least three of the characteristics.

28. The aggregate of claim 24, wherein the aggregate is characterized by at least four of the characteristics.

29. The aggregate of claim 24, wherein the aggregate is characterized by a) and b).

30. The aggregate of claim 24, wherein the aggregate is characterized by a) and c).

31. The aggregate of claim 24, wherein the aggrgate is characterized by a).

32. The aggregate of claim 24, wherein the aggregate is characterized by b).

33. The aggregate of claim 24, wherein the aggregate is characterized by c).

34. The aggregate of claim 24, wherein the aggregate is characterized by d).

35. The aggregate of claim 24, wherein the aggregate is characterized by e).

36. The aggrgegate of claim 24, wherein the aggregate is charcterized by a) and has a BET surface area of silica ash is said aggregate of from about 200 $m^2/g$ to about 700 $m^2/g$.

37. The aggregate of claim 24, wherein the aggregate has a t-area above about 100 $m^2/g$ and the difference between BET ($N_2$) and t-area is from about 10 to about 50 $m^2/g$.

38. The aggregate of claim 24, wherein when the aggregate is HF treated, the aggregate has a difference between BET ($N_2$) and t-area of from about 5 to about 40 $m^2/g$.

39. The aggregate of claim 24, wherein the ratio for c) is from about 0.1 to about 5.

40. The aggregate of claim 24, wherein the BET surface area of silica ash in said aggregate is from about 200 $m^2/g$ to about 700 $m^2/g$.

41. The aggregate of claim 24, wherein said aggregate has an elemental silicon content of from about 0.1 to about 25 wt %, based on the weight of the aggregate.

42. The aggregate of claim 24, wherein said aggregate has an elemental silicon content of from about 4 to about 10 wt %, based on the weight of the aggregate.

43. The aggregate of claim 24, wherein said aggregate has an elemental silicon content of from about 8 to about 15 wt %, based on the weight of the aggregate.

44. The aggregate of claim 24, wherein when said aggregate is incorporated into an elastomeric composition, the wet skid resistance of the elastomeric composition is improved compared to the same elastomeric composition having carbon black.

45. The aggregate of claim 24, wherein said aggregate imparts to an elastomer poorer abrasion resistance, comparable or higher loss tangent at low temperature and a lower loss tangent at high temperature, compared to carbon black.

46. The aggregate of claim 24, wherein when said aggergate is incorporated into an elastomeric composition, the rolling resistance of the elastomeric composition is improved compared to the same elastomeric composition having carbon black.

* * * * *